US011148680B2

(12) United States Patent
Sikorski

(10) Patent No.: US 11,148,680 B2
(45) Date of Patent: Oct. 19, 2021

(54) METHOD AND APPARATUS FOR USER-DEFINED DRIVE MODE CHANGES BASED ON OCCURRING CONDITIONS

(71) Applicant: FORD GLOBAL TECHNOLOGIES, LLC, Dearborn, MI (US)

(72) Inventor: Ryan Andrew Sikorski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 685 days.

(21) Appl. No.: 15/671,832

(22) Filed: Aug. 8, 2017

(65) Prior Publication Data
US 2019/0047583 A1    Feb. 14, 2019

(51) Int. Cl.
| | | |
|---|---|---|
| *B60W 50/08* | (2020.01) | |
| *B60W 30/182* | (2020.01) | |
| *B60W 50/00* | (2006.01) | |
| *B60W 10/04* | (2006.01) | |
| *B60W 10/20* | (2006.01) | |
| *B60W 10/22* | (2006.01) | |

(52) U.S. Cl.
CPC ........ *B60W 50/085* (2013.01); *B60W 30/182* (2013.01); *B60W 50/0098* (2013.01); *B60W 10/04* (2013.01); *B60W 10/20* (2013.01); *B60W 10/22* (2013.01); *B60W 2050/0063* (2013.01); *B60W 2520/10* (2013.01); *B60W 2554/00* (2020.02); *B60W 2555/20* (2020.02); *B60W 2556/50* (2020.02)

(58) Field of Classification Search
CPC .......... B60W 50/085; B60W 50/0098; B60W 30/182; B60W 10/20; B60W 2550/402; B60W 2520/10; B60W 10/04; B60W 2550/20; B60W 2550/12; B60W 2050/0063; B60W 10/22
See application file for complete search history.

(56) References Cited

U.S. PATENT DOCUMENTS

| | | | |
|---|---|---|---|
| 8,825,369 B2 | 9/2014 | Jin | |
| 8,958,965 B2 | 2/2015 | Perkins et al. | |
| 9,061,679 B2 | 6/2015 | Maruyama et al. | |
| 9,096,127 B2 | 8/2015 | Matsuzaki et al. | |
| 9,193,314 B1* | 11/2015 | Graham | B60W 40/09 |
| 9,346,460 B2 | 5/2016 | Mansur et al. | |
| 9,630,494 B1 | 4/2017 | Glauber | |
| 2009/0143936 A1* | 6/2009 | Craig | B60W 40/02 701/37 |
| 2012/0095659 A1 | 4/2012 | Rodrigues et al. | |
| 2013/0103274 A1 | 4/2013 | Binder et al. | |
| 2014/0236443 A1 | 8/2014 | Rodrigues et al. | |
| 2015/0025731 A1* | 1/2015 | Uehara | G05D 1/00 701/23 |

(Continued)

*Primary Examiner* — Alan D Hutchinson
(74) *Attorney, Agent, or Firm* — Michael Spenner; Brooks Kushman P.C.

(57) ABSTRACT

A system includes a processor configured to receive a first set of user-selected parameters, including first user-defined parameter values, the first set defining a condition for engaging a specific user-selected vehicle driving mode. The processor is also configured to receive data indicating current parameter values and automatically engage the user-selected vehicle driving mode responsive to the current parameter values matching first user-defined parameter values.

9 Claims, 3 Drawing Sheets

(56) References Cited

U.S. PATENT DOCUMENTS

2015/0142280 A1    5/2015   Tamoto et al.
2016/0375906 A1   12/2016   Jeon
2017/0080948 A1    3/2017   Lubbers et al.

* cited by examiner

METHOD AND APPARATUS FOR USER-DEFINED DRIVE MODE CHANGES BASED ON OCCURRING CONDITIONS

TECHNICAL FIELD

The illustrative embodiments generally relate to methods and apparatuses for user defined driving mode changes based on occurring conditions.

BACKGROUND

Vehicles frequently offer distinct drive modes that not only change traction but also elements such as, but not limited to, steering, handling, suspension, powertrain, calibration, and exhaust. These different drive modes offer a customized drive experience that can change with settings changes and produce different results based on the factors such as speed or road conditions. Essentially, a customer can select a mode to change the way driving the vehicle feels, compared to other modes, under similar conditions.

These drive modes are often not activatable as conveniently as other features in the vehicle. For example, a customer may have to manually reach down behind the shifter to push a button and in a manual-drive vehicle this may not be convenient at all, as one hand is typically on or near the shifter and the other on the wheel. Accordingly, it is often difficult to change a drive mode any time changing road conditions would create a desirable change, or even simply when a new driving experience change is desired.

SUMMARY

In a first illustrative embodiment, a system includes a processor configured to receive a first set of user-selected parameters, including first user-defined parameter values, the first set defining a condition for engaging a specific user-selected vehicle driving mode. The processor is also configured to receive data indicating current parameter values and automatically engage the user-selected vehicle driving mode responsive to the current parameter values matching first user-defined parameter values.

In a second illustrative embodiment, a system includes a processor configured to determine that a vehicle has entered an area, defined by user-designated geographic coordinates. The processor is also configured to determine that a secondary condition parameter associated with a user-selected drive mode that is also associated, by a user, with the user-designated coordinates, has been met and automatically engage the user-selected drive mode responsive to the vehicle being in the area and the secondary condition parameter being met.

In a third illustrative embodiment, a system includes a processor configured to determine that a vehicle is entering or is located within a user-defined geo-fenced area, the area having a user-designated drive mode associated therewith. The processor is also configured to automatically engaging the user-designated drive mode responsive to the determination.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
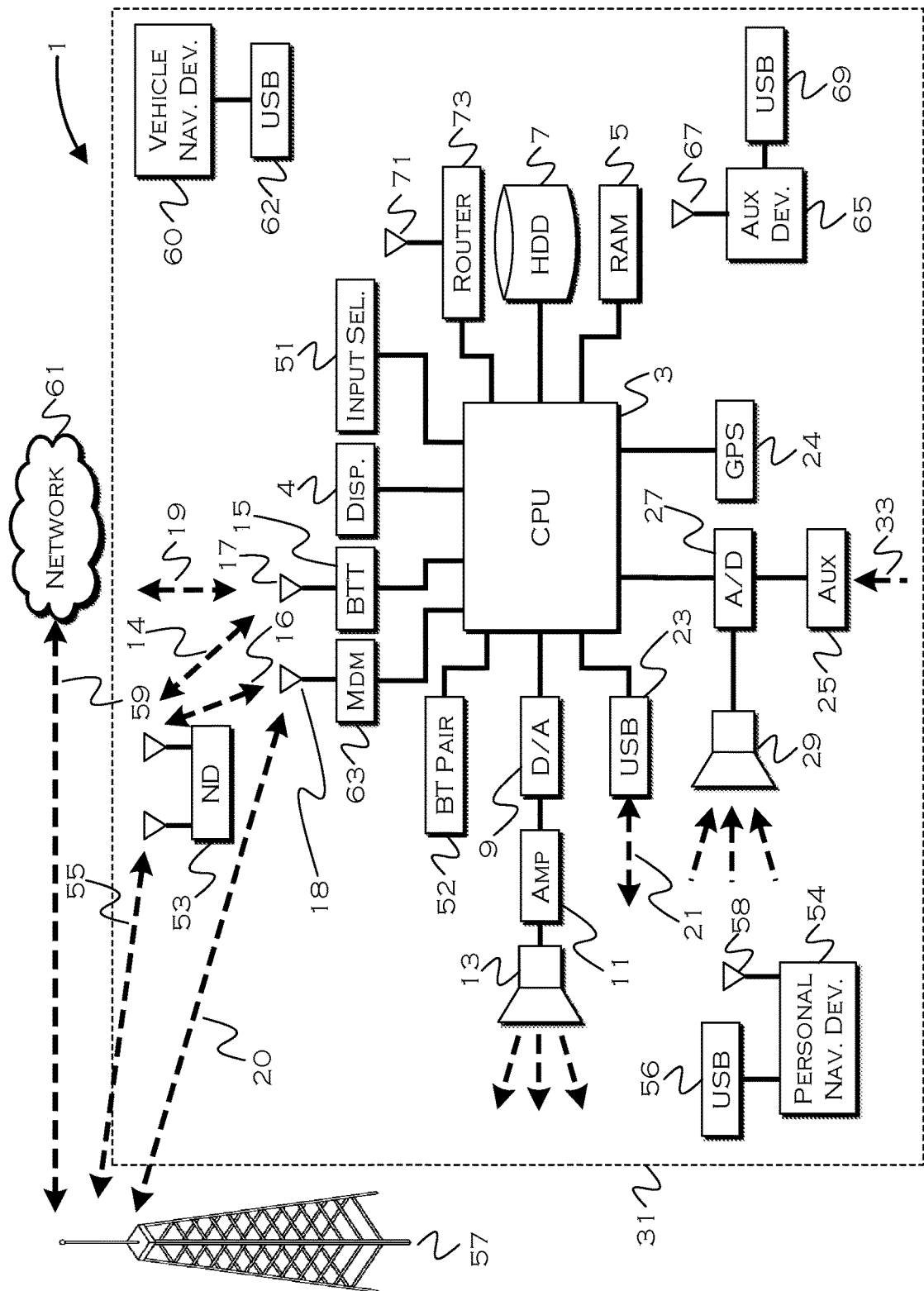
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Many modern vehicles have multiple options for driving modes, which engage various vehicle systems in different manners to provide improved speed, improved handling, better traction control, etc. Most of these driving modes are situationally specific, and frequently drivers will either not know when to engage a mode, or otherwise be occupied and not have time or the forethought to engage a certain mode.

Even when drivers electively use a certain mode, the driver may want to always use that mode in certain situations. But, since driving requires attention and because drivers are often distracted by other concerns, the driver may find it annoying to constantly engage the mode when needed and disengage the mode when not needed. For some situations, such as freeway driving, which occur constantly, but also change as a driver enters and exits certain roads, the driver may consider mode swapping to be too much of a hassle and may simply use the base mode under which the vehicle commonly operates.

The illustrative embodiments allow a driver to assign parameters to certain driving mode settings, so that when the parameters are met, the vehicle automatically engages the driving mode. In the examples presented, the driver can fence off a perimeter for designating a driving mode (i.e., the mode is engaged when crossing the perimeter to enter the area, and disengaged when exiting the area defined by the perimeter. Or, for example, the driver could designate an object and a proximity, and a certain mode could be engaged when within the defined proximity to the object. In still other instances, the driver could specify certain driving conditions under which a mode is engaged, which would allow for automatic mode-engagement when those conditions are met. Even if a driver is within a perimeter, for example, the mode-engagement may also require (based on settings) a certain parameter to be met, and unless the driver was within the perimeter and, for example, driving over 40 miles per hour, would the mode-change occur.

Figure 2:
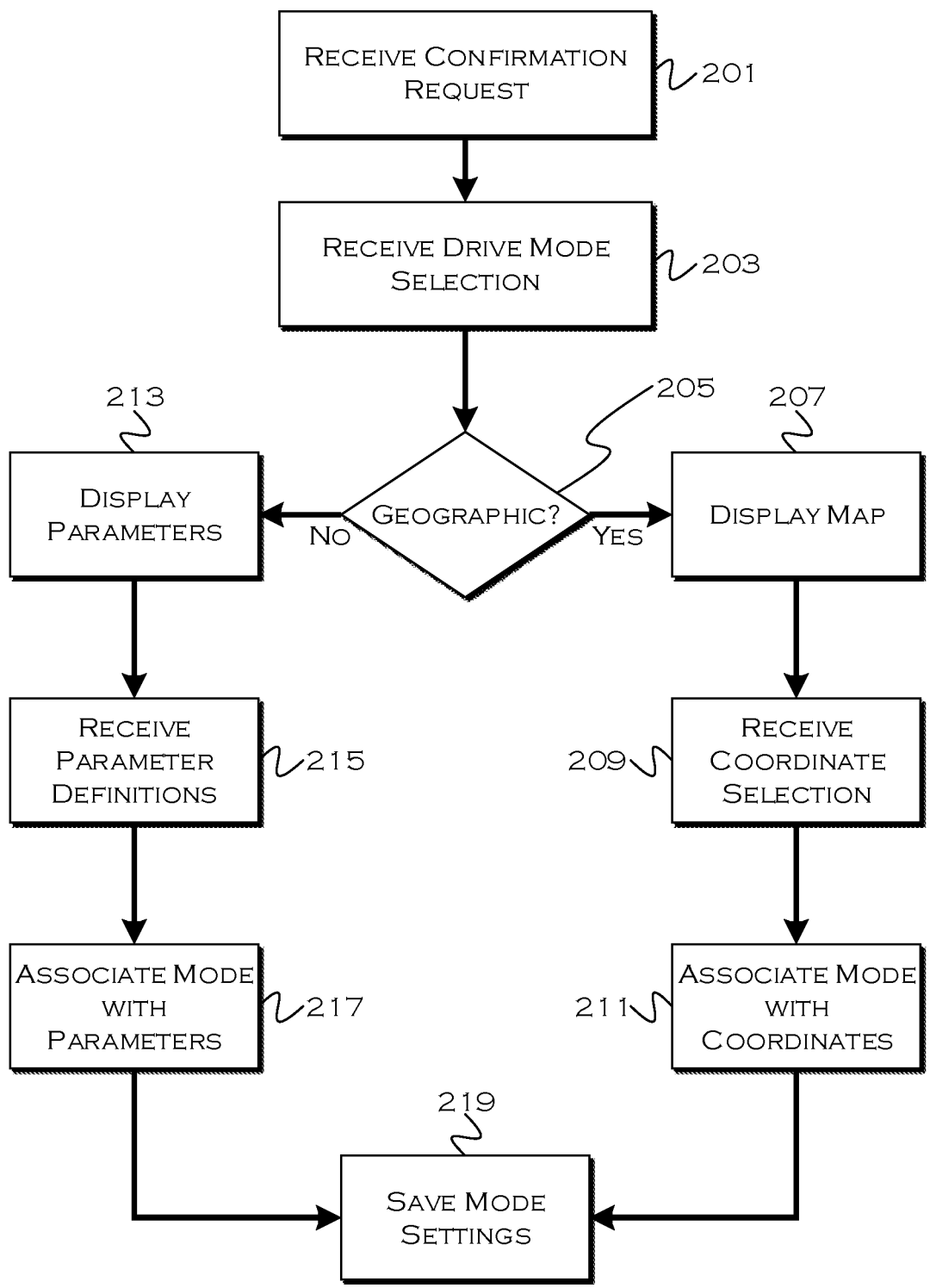
FIG. 2 shows an illustrative example of a driving-mode engagement configuration process.

FIG. 2 shows an illustrative example of a driving-mode engagement configuration process. In this example, the driver configures one or more driving mode scenarios. This can be done via a vehicle display, via a phone, a computer, or any other interfaceable object that allows for parameter definition and which can eventually store the set of parameters in a vehicle-accessible manner.

Here, the process receives a configuration request 201 and launches a mode-configuration process. The driver specifies 203 a particular drive mode (e.g., sport, off-road, track, normal). Changes to drive mode can control aspects of the vehicle such as, but not limited to, powertrain, steering, suspension, active exhaust, etc. The process then determines 205 if a geo-graphic or non-geographic parameter is to be associated with the mode. It is worth noting that both types of parameters can be associated with a single mode change.

If the parameter is geographic in nature, the process may display 207 a map including selectable areas so that the driver can select a region in which to apply a mode. The driver could also input coordinates or, for example, a building, location or city name in which the mode would apply. For example, if a municipality was known to be stringent about a certain aspect of noise, the driver could specify the municipality and the vehicle would limit noise-output in that municipality. Here, the process receives 209 driver selection of a set of coordinates from the map, input by the driver. The process then associates 211 the chosen mode with the coordinates.

If the mode has a non-geographic parameter associated therewith, the process may present 213 a set of definable parameters that can be associated with mode changes. This can include, for example, speeds, weather detection, night-driving, road conditions, etc. The driver selects any particular parameters relevant to that mode selection, and the process receives 215 driver-defined values for those parameters. The process then associates 217 those values with the particular driving mode and saves 219 the instructed changes.

So, for example, a driver may select an off-road mode for a stretch of road on the way to work that is unpaved. This could be a pure geographic parameter, and whenever the vehicle was within a defined coordinate set framing the unpaved road, the vehicle would transition to off-road mode. The driver could also select sport mode for all highways, and set a further parameter of a minimum vehicle speed of 50 mph. Thus, if map-data indicated a highway and a driver was also traveling above 50 mph, the vehicle would engage a sport mode. If the vehicle dropped below 50 mph, even if still on the highway, the vehicle could disengage the sport mode and revert to a normal or standard mode.

Figure 3:
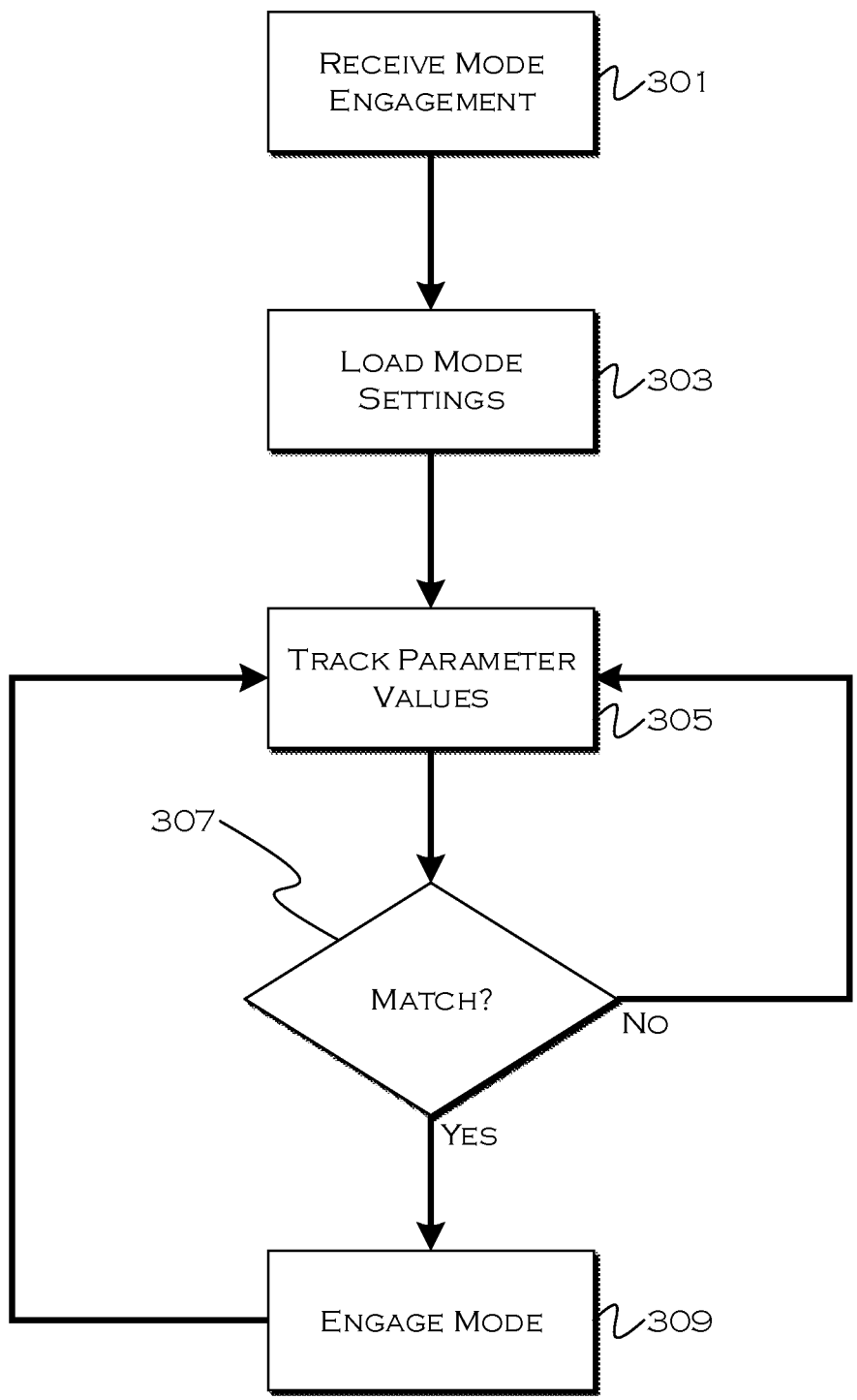
FIG. 3 shows an illustrative example of a driving-mode engagement process.

FIG. 3 shows an illustrative example of a driving-mode engagement process. In this example, the process receives 301 an indicator that a drive has begun and/or that GPS coordinates for a mode-change are within a predefined distance. This process could execute in the background while a drive was ongoing, or could set trigger states associated with at least one parameter (GPS, time, weather, etc) for any defined mode changes, so that if any of those parameters were met the process would execute and begin tracking any other needed parameters to execute the change.

Once the process is executing, the process loads 303 any mode settings associated with one or more of the changeable driving modes. This could include loading all mode parameters for tracking, or, for example, all parameters within a predefined distance of a current vehicle location (for GPS-enabled modes) and/or any parameter sets having at least one variable condition met.

Then, using vehicle sensor data (GPS, weather, speed, etc) and/or remote data (weather, traffic, etc) the process could begin to track 305 present parameter values to determine 307 when a set of parameters associated with a drive mode was matched. Once a match occurred, the process could engage 309 a drive mode associated with that particular matched set of parameters.

Parameters can be defined for both mode engagement and mode termination, and a different set of parameters may be defined for turning an instance of a drive mode on or off. For example, a driver may set a process to engage a sport-mode on a particular highway, whenever vehicle speed reaches 55, weather=no precipitation within ten miles, and there is no indicator of slowing traffic for at least five miles. The same mode may be disengaged based on speed dropping below 55, which would be the "reverse" of that triggering condition. But the weather trigger for disabling the mode might be "precipitation within two miles" and the traffic trigger for disabling the mode might be "slowing traffic within one mile."

This would essentially set up a mode that triggers when the driver is likely to be able to enjoy use of the mode for at least a certain period of time (represented by the expanded weather and traffic parameters) and then is enjoyed up until a point close in time to when the mode should actually be disabled (the narrowed parameters for weather and traffic). An alternative example would be to only disable the mode when the driver slows below 55, but requiring all the parameters for enablement of the mode, demonstrating that even a different set of parameters, not just different values, can represent triggering and disabling conditions.

Through use of the illustrative embodiments, drivers can set up quasi-smart mode changing settings for a vehicle that allows a driver to increase performance or experience improving mode usages while not distracting the driver from the task of driving. This can lead to both a more fun driving experience and an improved customer experience, among other things.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive a first set of user-selected parameters, including first user-defined parameter values, the first set defining a condition for engaging a specific user-selected vehicle driving mode;
receive data indicating current parameter values; and
automatically engage the user-selected vehicle driving mode responsive to the current parameter values matching the first user-defined parameter values.

2. The system of claim 1, wherein the parameters include GPS coordinates and the user-defined parameter values define a geo-fenced area.

3. The system of claim 2, wherein the parameters include weather and the user-defined parameter values include a weather condition.

4. The system of claim 2, wherein the parameters include traffic data and the user-defined parameter values include a traffic level.

5. The system of claim 2, wherein the parameters include vehicle speed and the user-defined parameter values include a vehicle speed value.

6. The system of claim 2, wherein the parameters include vehicle speed and the user-defined parameter values include a time of day or day of week.

7. The system of claim 1, wherein the processor is further configured to:
receive a second set of user-selected parameters, including second user-defined parameter values, the second set defining a condition for disengaging a previously automatically engaged user-selected vehicle driving mode.

8. The system of claim 7, wherein the second user-defined parameter values are different from the first user-defined parameter values.

9. The system of claim 7, wherein at least one of the first and second sets of parameters includes parameters different from the other set.

* * * * *